(12) United States Patent
Bomhoff et al.

(10) Patent No.: US 7,782,845 B2
(45) Date of Patent: Aug. 24, 2010

(54) ARBITRATED LOOP ADDRESS MANAGEMENT APPARATUS METHOD AND SYSTEM

(75) Inventors: Matthew David Bomhoff, Tucson, AZ (US); Brian James Cagno, Tucson, AZ (US); Gregg Steven Lucas, Tucson, AZ (US); Kenny Nian Gan Qiu, Tucson, AZ (US); Andrew Ellis Seidel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 10/993,554

(22) Filed: Nov. 19, 2004

(65) Prior Publication Data

US 2006/0109844 A1 May 25, 2006

(51) Int. Cl.
*H04L 12/26* (2006.01)
(52) U.S. Cl. .................. 370/389; 370/392; 370/404
(58) Field of Classification Search .................. 370/389, 370/392, 397, 399, 401, 404, 409
See application file for complete search history.

(56) References Cited

U.S. PATENT DOCUMENTS

| | | | | |
|---|---|---|---|---|
| 5,627,986 A | | 5/1997 | Frankland | 395/402 |
| 6,032,241 A | | 2/2000 | Green | 711/207 |
| RE37,613 E | | 3/2002 | Savage | 710/9 |
| 6,366,995 B1 | | 4/2002 | Vilkov et al. | 711/206 |
| 6,400,730 B1 | * | 6/2002 | Latif et al. | 370/466 |
| 6,401,128 B1 | * | 6/2002 | Stai et al. | 709/236 |
| 6,467,014 B1 | | 10/2002 | Bolt | 711/4 |
| 6,671,727 B1 | * | 12/2003 | Odenwald | 709/227 |
| 6,745,270 B1 | | 6/2004 | Barenys et al. | 710/104 |
| 6,748,459 B1 | * | 6/2004 | Lin et al. | 710/3 |
| 6,748,480 B2 | | 6/2004 | Chudnovsky et al. | 711/5 |
| 6,834,311 B2 | * | 12/2004 | Rao | 709/245 |
| 7,103,686 B1 | * | 9/2006 | Lin et al. | 710/100 |
| 7,162,658 B2 | * | 1/2007 | Golasky et al. | 714/6 |
| 2002/0016898 A1 | | 2/2002 | Hashimoto et al. | 711/202 |
| 2002/0034178 A1 | * | 3/2002 | Schmidt et al. | 370/386 |
| 2003/0076788 A1 | * | 4/2003 | Grabauskas et al. | 370/254 |
| 2003/0225993 A1 | | 12/2003 | Yagisawa et al. | 711/202 |
| 2004/0085972 A1 | * | 5/2004 | Warren et al. | 370/401 |
| 2006/0034192 A1 | * | 2/2006 | Hurley et al. | 370/254 |
| 2006/0274755 A1 | * | 12/2006 | Brewer et al. | 370/392 |

\* cited by examiner

*Primary Examiner*—Pankaj Kumar
*Assistant Examiner*—Duc T Duong
(74) *Attorney, Agent, or Firm*—Kunzler Needham Massey & Thorpe

(57) ABSTRACT

An apparatus, system, and method are disclosed for automatically and transparently managing addresses in an arbitrated loop network. An arbitrated loop network switch is programmed with an address map and configured with the necessary modules to monitor an address assignment process and associate soft assigned addresses claimed during the address arbitration process with physical slot addresses. In one embodiment, the address fields of packets addressing a specific physical slot are changed (in route) to the soft address assigned during the address arbitration process. The entire process may be transparent to the rest of the network and to users. The present invention facilitates maintaining a physically ordered addressing scheme despite any soft addressing that occurs during loop initialization.

25 Claims, 4 Drawing Sheets

ARBITRATED LOOP ADDRESS MANAGEMENT APPARATUS METHOD AND SYSTEM

BACKGROUND OF THE INVENTION

1. Field of the Invention

The present invention relates generally to means and methods for addressing networked devices in networking systems. Specifically, the present invention relates to apparatus, systems, and methods for managing addresses, priority schemes and device locations in arbitrated loop networks.

2. Description of the Related Art

Arbitrated loop topology may be used to interconnect devices via a network loop that connects the transmit output port of one device to the receive port of the next device in the loop. Typically, each device on the loop must have a unique address in order to communicate on the network. In many arbitrated loop networks, address assignments are automatically determined. At loop initialization, or in response to removal or insertion of a device, the loop may undergo an address assignment process known as address arbitration.

Arbitrated loop networks may support both hard and soft assigned addressing. Hard addresses are addresses that are provided via hardware such as a series of switches or cables. A soft address is an address that is assigned to a device for a period of time. Soft assigned addresses can change each time system power is applied, or each time the system is reset.

Hard addressing enables priority schemes and device location. If an address can be depended on to be consistent and unchanging, priority schemes can be devised that allow certain networked devices to receive their communications quicker than other networked devices, allowing more important network packets to be routed first. Consistent and unchanging addresses also allow a physical mapping scheme. Hard addresses can be set or mapped to correlate with the physical slots in which the networked devices reside.

Among other uses, hard addressing is extremely beneficial whenever devices need to be serviced. Because the hard address correlates to a physical location, a malfunctioning device can be easily located. For example, disk arrays benefit greatly from a physical mapping scheme. Typically, the disks that form the array reside in specific slots within enclosures. Whenever a disk fails or produces errors, service personnel need to find that disk quickly. If the disk's physical slot address correlates with the disk's loop address, service personnel can quickly discover which disk is creating errors and locate its physical location so that it can be repaired or replaced.

Fibre channel arbitrated loop protocol (FC-AL) is an interconnection standard that was created to address the need for high-speed network connections that could support bandwidth-intensive data transfers. Fibre channel optionally provides support for switched point-to-point connections between communicating devices. Particularly with point-to-point communication, Fibre Channel networks require accurate and consistent addressing amongst the networked devices for efficient operation.

During initialization of a Fibre Channel network, one device is designated as a master and each successive device in the loop sets a bit within an allocation bitmap to claim a particular address. If all the addresses are unique and each device claims what the network expects it to claim, the network operates efficiently. However, if a fault occurs such as a fault in the networked device or a backplane, for example a fault caused by a bad pin or broken wire, the device will claim what appears to be a random address in the network. If that address conflicts with an address another device tries to claim, that device will also claim an unpredictable (i.e. soft) address.

The result of the aforementioned issues is a breakdown in the loop's addressing scheme. Such a breakdown interferes with planned prioritization and physical location mapping. The results are degraded network performance and the inability to easily locate the faulty device.

From the foregoing discussion, it should be apparent that a need exists for an apparatus, system, and method that automatically and transparently translate any soft addresses claimed by any network device to a hard or physical slot address, or any address that the network expects. Such an apparatus, system and method most beneficially would not require human intervention in order to ensure that the network addressing is consistent and assigned as expected.

Beneficially, such an apparatus, system, and method would improve an arbitrated loop network's reliability and efficiency by reducing down time by facilitating rapid identification and location of faulty devices. Such an apparatus, system and method would preferably be transparent to the networked devices on the loop so that regardless of the address that a networked device claims, the network may see the device at the desired address. Such an apparatus, system and method would prevent address conflicts on the network and enforce a consistent addressing and priority scheme.

SUMMARY OF THE INVENTION

The present invention has been developed in response to the present state of the art, and in particular, in response to the problems and needs in the art that have not yet been fully solved by currently available technology for managing addresses in an arbitrated loop network. Accordingly, the present invention has been developed to provide an apparatus, method, and system for managing messaging in an arbitrated loop network that overcomes many or all of the above-discussed shortcomings in the art.

In one aspect of the invention, an apparatus for managing messaging in an arbitrated loop network includes an address map configured to associate desired addresses with assigned addresses, an address assignment monitor configured to monitor an address assignment process in an arbitrated loop network and populate the address map, and a switching array configured to route packets to devices attached to the arbitrated loop network using the address map. In one embodiment, the desired addresses correspond to specific ports on the switching array, and the switching array supports a loop mode during initialization and a point-to-point routing mode during operation.

In another aspect of the present invention, a method for managing messaging in an arbitrated loop network includes monitoring an address assignment process in an arbitrated loop network, populating an address map during the address assignment process, and routing packets to devices attached to the arbitrated loop network using the address map.

It should be noted that references to features, advantages, or similar language included in this specification does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention facilitates transparent and automatic address management in an arbitrated loop network. The present invention in certain embodiments also facilitates the use of any proprietary priority, addressing, or physical mapping scheme desired. These and other features and advantages of the present invention will become more fully apparent from the following description and appended claims, or may be learned by the practice of the invention as set forth hereinafter.

DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
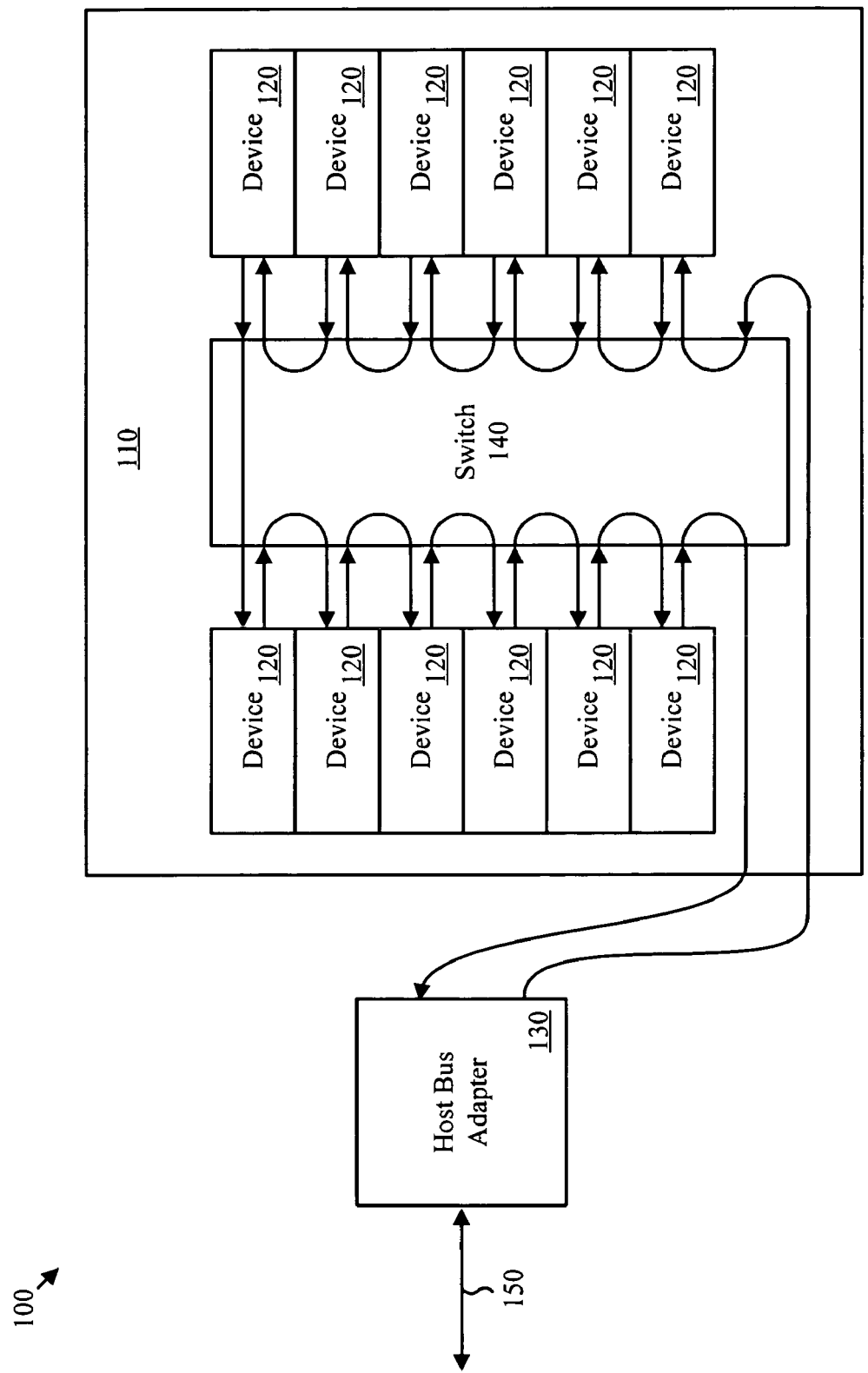
FIG. 1 is a block diagram depicting one embodiment of an address management system of the present invention.

FIG. 1 is a block diagram depicting one embodiment of an address management system 100 of the present invention. As depicted, the address management system 100 includes an enclosure 110, a set of networked devices 120, one or more host bus adapters 130, a switch 140, and a host connection 150. The network address management system 100 ensures that each networked device has a loop-expected address, facilitating efficient network throughput.

The enclosure 110 encloses some or all of the networked devices 120. In embodiment, more than one enclosure 110 may be used to enclose the networked devices 120. The enclosure 110 may be configured with physical slots that receive the networked devices 120. Each physical slot may correspond to an address. The depicted enclosure 110 also includes a switch 140. In one embodiment, many of the networked devices 120 are storage devices.

The networked devices 120 may each claim an address during address arbitration. In an ideal situation, the claimed addresses are the same as the addresses expected by the system. In one embodiment, the address claimed by each networked device 120 is the same addresses as the physical slot in which it resides. In response to possible errors in the loop, the networked devices 120 may claim arbitrary soft addresses that are different than the desired addresses for the networked devices 120.

The depicted host bus adapter 130 connects a host, or the like, to the networked devices 120 via the host connection 150. The host bus adapter 130 may manage network packets intended for devices attached to the switch 140. For optimum performance, the host bus adapter 130 may, in certain embodiments, require knowledge of the actual addresses of all the devices in the network. In fact, the host bus adapter 130 may store context information that enables the host bus adapter 130 to track I/O requests and link them to the data being sent to and from devices attached to the switch 140. The depicted embodiment includes a single host bus adapter 130. Another embodiment may include redundant host bus adapters 130. In an additional embodiment, the host bus adapter 130 is located within the enclosure 110.

The switch 140 manages the arbitrated loop network. The switch 140 connects the networked devices 120 to each other and to the host bus controller 130. In the depicted embodiment, the networked devices are connected with the transmit output port of one device connected to the receive port of the next device. The switch 140 routes the packets to the appropriate networked device. In response to the host bus adapters 130 receiving packets destined for the arbitrated loop network, the host bus adapters 130 may send those packets to the switch 140 to be delivered to the appropriate networked device 120.

The switch 140 may monitor an address assignment process and translate address field information within packets intended for a particular hard address to a soft address assigned to a networked device during initialization. Consequently, if one or more of the networked devices 120 have selected a random soft address because of some type of fault, the switch 140 will deliver the packet to the correct networked device 120.

The host connection 150 is connected to the host bus adapter 130. In one embodiment, the host connection 150 is connected to transaction processing data base servers that handle thousands of input/output requests at any point in time. The host connection 150 routes packets to and from the host to the host bus adapter 130.

Figure 2:
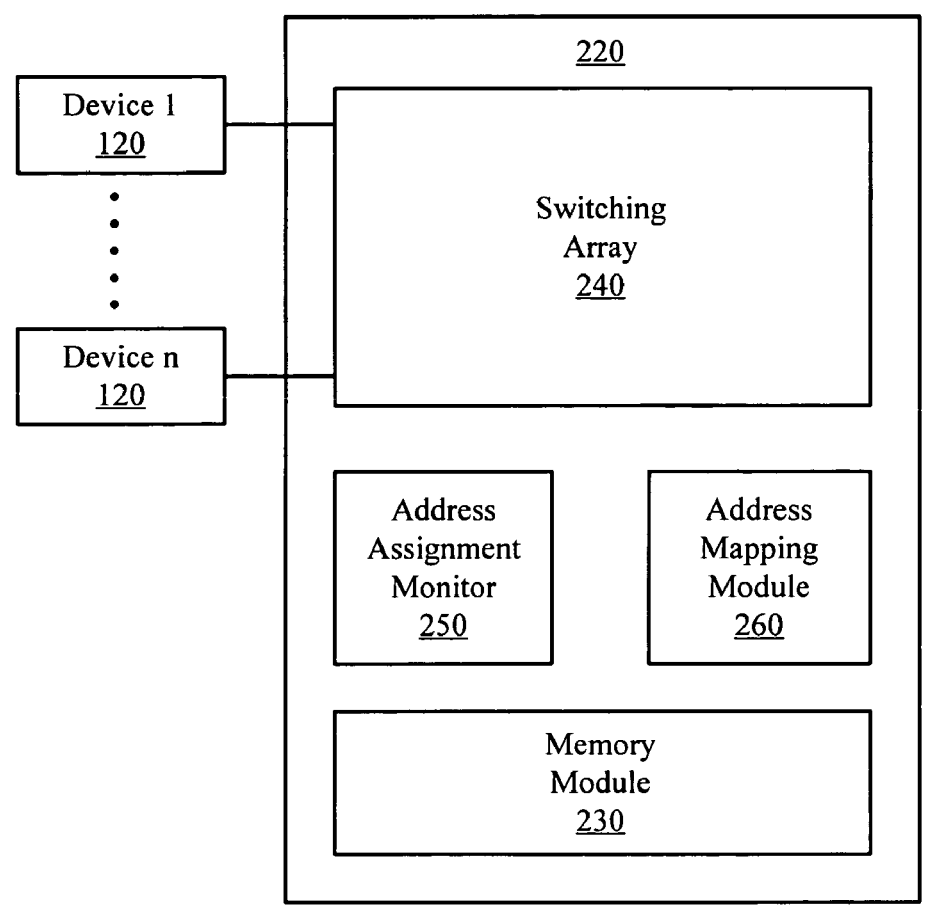
FIG. 2 is a block diagram one embodiment of an address management apparatus of the present invention.

FIG. 2 is a block diagram depicting one embodiment of an address management apparatus 200 of the present invention. As depicted, the address management apparatus 200 includes a set of networked devices 120, an arbitrated loop switch 220 that includes a memory module 230, a switching array 240, an address assignment monitor 250, and an address mapping module 260. The arbitrated loop switch 220 is one example of the switch 140 depicted in FIG. 1. The address management apparatus 200 facilitates the assignment of proper or desired addresses within an arbitrated loop network of devices.

As depicted, the networked devices 120 are connected to the arbitrated loop switch 220. The arbitrated loop network switch 220 handles the routing of the packets to the networked devices 120. In one embodiment, the arbitrated loop network switch 220 allows the networked devices 120 and the host bus adapter 130 to join the network at initialization. In another embodiment, the arbitrated loop network switch 220 allows only the host bus adapter 130 onto the network at initialization. Thus, the arbitrated loop network switch 220 has more control over the address arbitration and can monitor the address arbitration process.

During address arbitration, the networked devices 120 each claim a unique address. Occasionally, the networked devices claim an arbitrary soft address in response to some error. These arbitrary soft addresses may be different than the desired or loop expected addresses. In response to the arbitrated loop network initialization, the arbitrated loop network switch 220 may monitor communications between the networked devices 120 in order to monitor the assignment of soft addresses.

The memory module 230 may be configured with an address map containing the physical slot addresses of each networked device 120. In the depicted embodiment, the memory module 230 is on the arbitrated loop switch 220. In another embodiment, the memory module 230 is not located on the arbitrated loop switch 220, but is connected to it. The address map (not shown) may be stored in a storage device such as a device management processor, a server, or a self-loading EPROM, etc. The memory module 230 may provide the address mapping module 260 with the address map.

The switching array 240 handles the actual routing of the packets to the networked devices 120. During address arbitration, the switching array 240 may serialize the input and output of the networked devices 120 so that the address assignment monitor 250 can monitor the address arbitration process. After address arbitration, the arbitrated loop switch 220 may change modes and routes packets in a point-to-point mode.

The address assignment monitor 250 monitors the address assignment process and collects information on the addresses assigned to the networked devices 120. In one embodiment, the collected information is placed in an address map stored in the memory module 230. The address mapping module 260 maps expected addresses within packets to assigned addresses. In one embodiment, address fields within packets routed by the switching array 240 are automatically replaced with the assigned address by the address mapping module 260. The rest of the system, however, behaves as if the networked devices 120 are addressed by the addresses the system expects. Thus, the address management apparatus 200 transparently manages the addresses, reduces routing errors, and improves packet throughput.

The following schematic flow chart diagrams are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
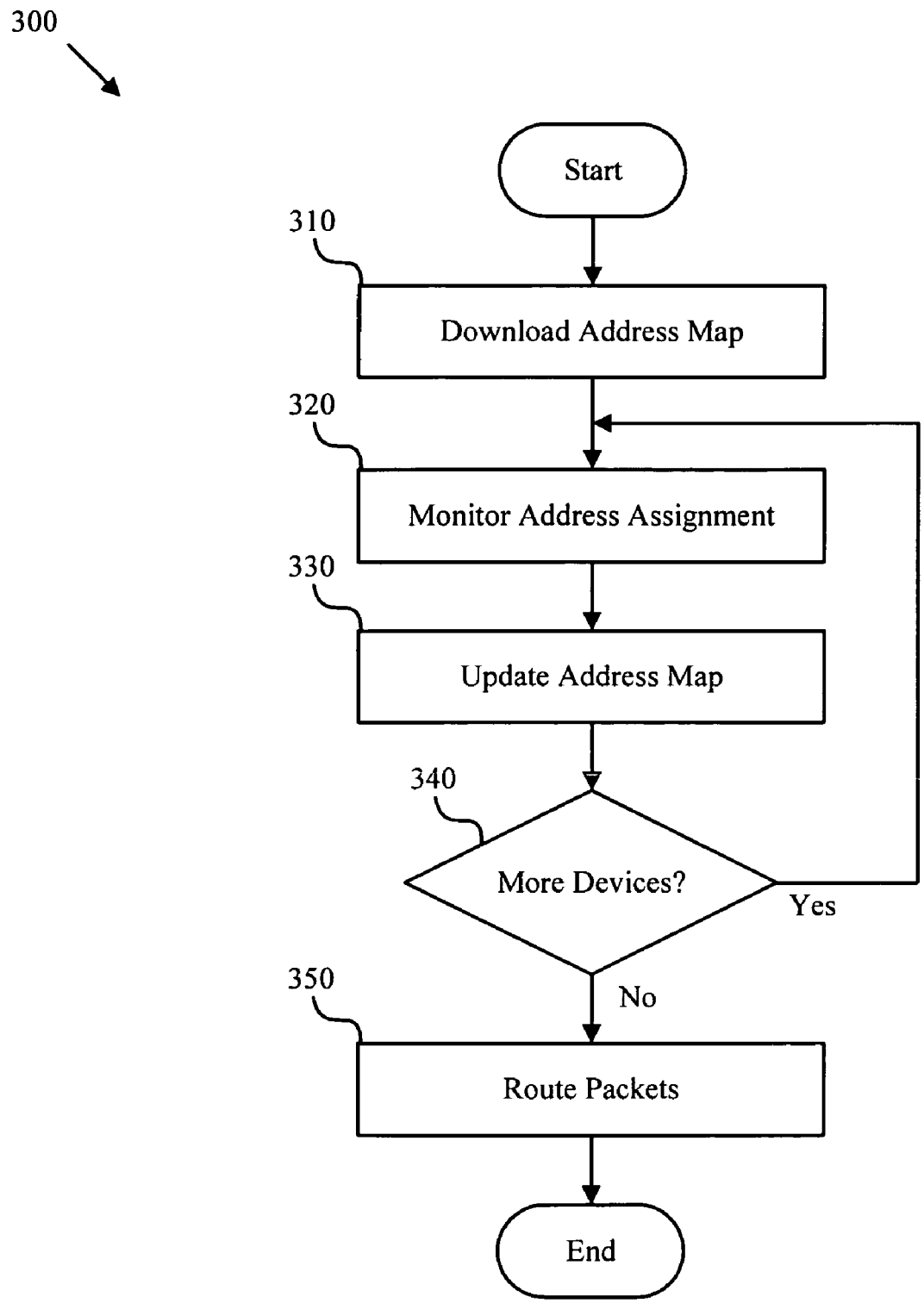
FIG. 3 is a flow chart diagram depicting one embodiment of an address management method of the present invention.

FIG. 3 is a flow chart diagram depicting one embodiment of an arbitrated loop address management method 300 of the present invention. As depicted, the address management method 300 includes a download map step 310, a monitor address arbitration step 320, an update address map step 330, a more devices test 340, and a route packets step 350. The address management method 300 facilitates assignment of proper, or loop-expected, addresses to an arbitrated loop network of devices. The address management method 300 may be conducted in conjunction with the system and apparatus depicted in FIGS. 1 and 2.

The download map step 310 downloads an address map into the arbitrated loop network switch. The address map may be a data structure containing the address of every networked device. The monitor address assignment step 320 monitors the arbitrated loop's initialization or address arbitration process. In one embodiment, each networked device may claim a soft address during initialization by routing an address allocation bitmap around the loop. The monitor address assignment step 320 investigates each packet sent between the networked devices to discover what soft address each networked device is claiming.

The update address map step 330 updates the address map downloaded into the arbitrated loop switch with each networked device's claimed soft address. As the packets are monitored for the address claimed by each networked device, the update address map step 330 updates the address map data structure with the soft assigned address. At the completion of the arbitrated loop's address arbitration process, the arbitrated loop switch may have a data structure, such as an address map, that is useful for mapping expected addresses to the soft addresses assigned to the network devices. The expected addresses may be any address the arbitrated loop expects a networked device to have, such as a physical slot address or a hard address. In one embodiment, the expected address is an address that cannot change from one loop initialization to the next.

The more devices test 340 ascertains whether the address arbitration process is finished, or whether more networked devices still need to claim addresses. In one embodiment, the more devices test 340 corresponds to testing if an "end of loop init" message has occurred. If more networked devices still need to claim soft addresses, the more devices test 340 returns to the monitor address arbitration step 310. If all networked devices have claimed soft addresses, the address arbitration process is complete, and the more devices test 340 continues to the route packets step 350.

The route packets step 350 routes packets to the networked devices around the arbitrated loop. Because the arbitrated loop switch now has a data structure mapping each networked device's soft assigned address to its expected address, route packets step 350 can route packets point-to-point in the loop.

Figure 4:
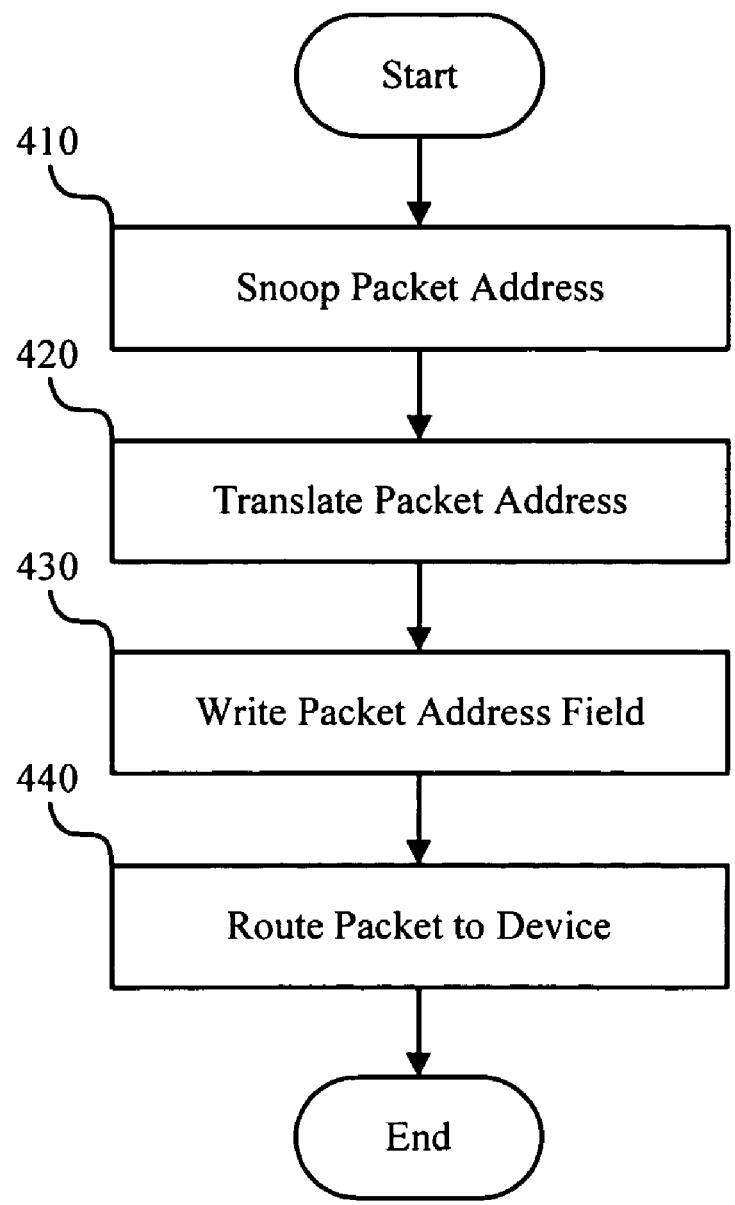
FIG. 4 is a flow chart diagram depicting one embodiment of a point-to-point routing method of the present invention.

FIG. 4 is a flow chart diagram depicting one embodiment of a point-to-point routing method 400 of the present invention. As depicted, the point-to-point packet routing method 400 includes a snoop address step 410, a translate address step 420, a write address step 430, and a route packet step 440. The point-to-point packet routing method 400 facilitates efficient throughput in an arbitrated loop.

The snoop address step 410 looks at each packet coming into the arbitrated loop to check its address. Packets come into an arbitrated loop addressed to the expected address of a networked device. During address arbitration, some networked devices might not have claimed the address they were expected to. The snoop address step 410 checks each incoming packet and captures the expected address of the networked device that packet is intended for.

The translate address step 420 translates the networked device's address contained in the packet to the networked device's expected address. The translate address step 420 may access an address map that maps expected addresses to assigned addresses.

The write address step 430 changes the packet's address field to the actual assigned address. The write address step 430 may utilize the assigned address provided by the translate address step 420. The write address step 430 may replace the expected address in the packet's address field with the networked device's assigned soft address. Subsequently, the route packet step 440 routes the packet to the correct networked device.

The present invention manages message addressing in an arbitrated loop network. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing messaging in an arbitrated loop network, the apparatus comprising:
a memory device storing executable code;
a processor executing the executable code, the executable code comprising
an address map;
an address assignment monitor monitoring an address assignment process for a device in an arbitrated loop network and populating the address map to map an expected address for the device to an assigned address different from the expected address and claimed for the device in response to an error wherein the expected address and the assigned address are arbitrated loop network addresses; and
a switching array replacing the expected address with the assigned address in packets addressed to the device.

2. The apparatus of claim 1, wherein the expected address corresponds to a specific port of the switching array.

3. The apparatus of claim 2, the switching array further changing from a loop mode to a point-to-point mode.

4. The apparatus of claim 1, further comprising a memory storing the address map.

5. The apparatus of claim 4, wherein the memory is a non-volatile memory.

6. The apparatus of claim 1, wherein the device is a networked device operably connected to the switching array.

7. The apparatus of claim 6, wherein the networked device is a storage device.

8. The apparatus of claim 7, further comprising an enclosure enclosing the switching array and the networked device.

9. A method for managing messaging in an arbitrated loop network, the method comprising:
monitoring, by use of a processor, an address assignment process for a device in an arbitrated loop network;
populating an address map during the address assignment process to map an expected address for the device to an assigned address different from the expected address and claimed for the device in response to an error wherein the expected address and the assigned address are arbitrated loop network addresses; and
replacing the expected address with the assigned address in packets addressed to the device.

10. The method of claim 9, wherein the expected address corresponds to a specific port of a switching array.

11. The method of claim 9, further comprising changing the switching array from a loop mode to a point-to-point mode.

12. The method of claim 9, wherein routing packets in the arbitrated loop comprises point-to-point routing via the switching array.

13. The method of claim 9, further comprising changing a destination address field in the packets to the assigned address.

14. A system for managing messaging in an arbitrated loop network, the system comprising:
an arbitrated loop network; and
a switch monitoring an address assignment process for a device in the arbitrated loop network, updating an address map associated with the switch to map an expected address for the device to an assigned address different from the expected address and claimed for the device in response to an error wherein the expected address and the assigned address are arbitrated loop network addresses, and replacing the expected address with the assigned address in packets addressed to the device.

15. The system of claim 14, wherein the expected address corresponds to a specific port of the switch.

16. The system of claim 14, further comprising a plurality of networked devices.

17. The system of claim 16, wherein the plurality of networked devices comprise a plurality of storage devices.

18. The system of claim 16, further comprising an enclosure enclosing at least one networked device of the plurality of networked devices.

19. The system of claim 14, further comprising a host.

20. The system of claim 14, further comprising a host bus adapter.

21. A memory device tangibly storing executable code executed by a processor to perform a method managing messaging in an arbitrated loop network, the method comprising:
- monitoring an address assignment process for a device in an arbitrated loop network;
- populating an address map during the address assignment process to map an expected address for the device to an assigned address different from the expected address and claimed for the device in response to an error wherein the expected address and the assigned address are arbitrated loop network addresses; and
- replacing the expected address with the assigned address in packets addressed to the device.

22. The memory device of claim 21, wherein the expected address corresponds to a specific port on a switching array.

23. The memory device of claim 21, wherein the method further comprises changing the switching array from a loop mode to a point-to-point mode.

24. The memory device of claim 21, wherein the packets in the arbitrated loop comprises point-to-point routing via the switching array.

25. An apparatus for managing messaging in an arbitrated loop network, the apparatus comprising:
- a memory device storing executable code;
- a processor executing the executable code, the executable code comprising
- means for monitoring an address assignment process for a device in an arbitrated loop network;
- means for populating an address map to map an expected address to an assigned address different from the expected address and claimed for the device in response to an error wherein the expected address and the assigned address are arbitrated loop network addresses; and
- means for replacing the expected address with the assigned address in packets addressed to the device.

* * * * *